US012704612B2

(12) United States Patent
Meng et al.

(10) Patent No.: US 12,704,612 B2
(45) **Date of Patent: *Aug. 11, 2026**

(54) SENSOR TRIGGERING BASED ON SENSOR SIMULATION

(71) Applicant: Pony AI Inc., Grand Cayman (KY)

(72) Inventors: Pingfan Meng, Dublin, CA (US); Zhenhao Pan, Sunnyvale, CA (US); Stephen Lee, Fremont, CA (US); Wei-yang Chiu, Fremont, CA (US); Kai Chen, San Jose, CA (US)

(73) Assignee: Pony AI Inc., Grand Cayman (KY)

(*) Notice: Subject to any disclaimer, the term of this patent is extended or adjusted under 35 U.S.C. 154(b) by 580 days.

This patent is subject to a terminal disclaimer.

(21) Appl. No.: 18/337,234

(22) Filed: Jun. 19, 2023

(65) Prior Publication Data

US 2023/0333229 A1 Oct. 19, 2023

Related U.S. Application Data

(63) Continuation of application No. 16/777,349, filed on Jan. 30, 2020, now Pat. No. 11,681,032.

(51) Int. Cl.

| | |
|---|---|
| ***G01S 7/497*** | (2006.01) |
| ***G01S 17/931*** | (2020.01) |
| ***G05B 19/042*** | (2006.01) |
| ***G06F 3/00*** | (2006.01) |
| ***G06N 3/126*** | (2023.01) |

(52) U.S. Cl.
CPC .......... *G01S 7/4972* (2013.01); *G01S 17/931* (2020.01); *G05B 19/0423* (2013.01); *G06F 3/005* (2013.01); *G06N 3/126* (2013.01)

(58) Field of Classification Search
CPC .... G01S 7/4972; G01S 17/931; G01S 7/4808; G01S 17/89; G01S 7/52004; G01S 17/86; G05B 19/0423; G05B 2219/25428; G05B 19/0426; G05B 13/048; G06F 3/005; G06N 3/126; G06N 20/00; G06V 20/56
See application file for complete search history.

(56) References Cited

U.S. PATENT DOCUMENTS

| | | | |
|---|---|---|---|
| 9,354,058 B2 | 5/2016 | Yost | |
| 9,740,944 B2 | 8/2017 | Micks et al. | |
| 9,990,816 B2 | 6/2018 | Rihn | |
| 10,409,272 B2 | 9/2019 | Kroupnova et al. | |
| 10,732,261 B1 * | 8/2020 | Wang | G05D 1/0257 |

(Continued)

*Primary Examiner* — Manuel A Rivera Vargas
(74) *Attorney, Agent, or Firm* — Sheppard, Mullin, Richter & Hampton LLP; Xin Xie

(57) ABSTRACT

Described herein are systems, methods, and non-transitory computer readable media for triggering a sensor operation of a second sensor (e.g., a camera) based on a predicted time of alignment with a first sensor (e.g., a LiDAR), where operation of the second sensor is simulated to determine the predicted time of alignment. In this manner, the sensor data captured by the two sensors is ensured to be substantially synchronized with respect to the physical environment being sensed. This sensor data synchronization based on predicted alignment of the sensors solves the technical problem of lack of sensor coordination and sensor data synchronization that would otherwise result from the latency associated with communication between sensors and a centralized controller and/or between sensors themselves.

20 Claims, 5 Drawing Sheets

(56) References Cited

U.S. PATENT DOCUMENTS

| | | | | |
|---|---|---|---|---|
| 11,474,255 | B2 | 10/2022 | Zhao et al. | |
| 2017/0177954 | A1* | 6/2017 | Micks | G01S 13/931 |
| 2018/0067489 | A1 | 3/2018 | Oder et al. | |
| 2020/0272148 | A1* | 8/2020 | Karasev | G01S 17/58 |
| 2021/0150279 | A1* | 5/2021 | Dudzik | G01S 17/931 |

* cited by examiner

400

Sensors
404
Network(s)
406
Computing Device
402
Data Storage
418
O/S
420
DBMS
422
Virtual Sensor System
424
Predictive Model
426
Training/Calibration Engine
428
416
Processor(s)
408
Memory Device(s)
410
I/O Interface(s)
412
Network Interface(s)
414

SENSOR TRIGGERING BASED ON SENSOR SIMULATION

CROSS-REFERENCE TO RELATED APPLICATION

This application is a continuation of U.S. application Ser. No. 16/777,349, filed Jan. 30, 2020, the contents of which are incorporated herein by reference in its entirety.

BACKGROUND

The present invention relates generally to sensor coordination, and more particularly, in some embodiments, to a virtual sensor system that simulates sensor operation to enable sensor triggering and improved sensor coordination.

On-board sensors in a vehicle, such as an autonomous vehicle (AV), supplement and bolster the vehicle's FOV by providing continuous streams of sensor data captured from the vehicle's surrounding environment. Sensor data is used in connection with a diverse range of vehicle-based applications including, for example, blind spot detection, lane change assisting, rear-end radar for collision warning or collision avoidance, park assisting, cross-traffic monitoring, brake assisting, emergency braking, and automated distance control.

On-board sensors can be broadly categorized into two types: active sensors that provide their own energy source for operation and passive sensors that rely on an external power source for operation. On-board sensors include, for example, cameras, light detection and ranging (LiDAR)-based systems, radar-based systems, Global Positioning System (GPS) systems, sonar-based sensors, ultrasonic sensors, inertial measurement units (IMUs), accelerometers, gyroscopes, magnetometers, and far infrared (FIR) sensors. Sensor data may include image data, reflected laser data, or the like. Often, images captured by on-board sensors utilize a three-dimensional (3D) coordinate system to determine the distance and angle of objects in the image with respect to each other and with respect to the vehicle. In particular, such real-time spatial information may be acquired near a vehicle using various on-board sensors located throughout the vehicle, which may then be processed to calculate various vehicle parameters and determine safe driving operations of the vehicle.

An AV performs a myriad of complex calculations based on the sensor data captured from a variety of on-board vehicle sensors to facilitate a multitude of operations required for autonomous vehicle operation such as object detection, object classification, object tracking, collision avoidance, vehicle navigation, vehicle acceleration and deceleration, and the like. In order to ensure the accuracy of the calculations, and thus, safe autonomous vehicle operation, coordination and synchronization between the various sensors providing the sensor data is important. Discussed herein are technical solutions that address technical drawbacks associated with convention sensor coordination systems and synchronization of sensor data by such systems.

SUMMARY

In an example embodiment, a computer-implemented method for triggering a sensor operation is disclosed. The computer-implemented method includes simulating operation of a first sensor, predicting, based at least in part on the simulated operation of the first sensor, a time at which the first sensor will be aligned with a second sensor, and triggering the second sensor to perform the sensor operation based at least in part on the predicted time. In an example embodiment, simulating operation of the first sensor includes receiving a set of initial parameters associated with the operation of the first sensor and generating a virtual sensor system based at least in part on the set of initial parameters. In an example embodiment, generating the virtual sensor system includes training a predictive model based at least in part on the set of initial parameters. In an example embodiment, the trained predictive model is configured to perform the predicting.

In an example embodiment, the method further includes determining an error between the predicted time and an actual time that the first sensor was aligned with a second sensor, providing feedback data that includes an indication of the error to the predictive model, and re-training the predictive model based at least in part on the feedback data to improve a predictive capability of the predictive model.

In an example embodiment, the time is a first predicted time, and the method further includes predicting, using the re-trained predictive model, a second time at which the first sensor will be aligned with the second sensor and triggering the second sensor to perform the sensor operation based at least in part on the second predicted time. In an example embodiment, the error between the first predicted time and a first actual time that the first sensor was aligned with the second sensor is a first error, and the method further includes determining a second error between the second predicted time and a second actual time that the first sensor was aligned with the second sensor. In an example embodiment, the second error is smaller than the first error.

In an example embodiment, triggering the second sensor to perform the sensor operation includes triggering the second sensor to perform the sensor operation at the predicted time.

In an example embodiment, the first sensor is a LiDAR sensor and the second sensor is a camera. In an example embodiment, the sensor operation is an image capture function of the camera. In an example embodiment, the method further includes determining a delay associated with the image capture function of the camera. In an example embodiment, the delay results from a rolling shutter of the camera that causes the camera to capture different portions of image data of a scene at different times. In an example embodiment, triggering the second sensor to perform the sensor operation includes triggering the camera to perform the image capture function prior to or after the predicted time based at least in part on the delay.

In an example embodiment, a system for triggering a sensor operation is disclosed. The system includes at least one processor and at least one memory storing computer-executable instructions. The at least one processor is configured to access the at least one memory and execute the computer-executable instructions to perform a set of operations including simulating operation of a first sensor, predicting, based at least in part on the simulated operation of the first sensor, a time at which the first sensor will be aligned with a second sensor, and triggering the second sensor to perform the sensor operation based at least in part on the predicted time. The above-described system is further configured to perform any of the operations/functions and may include any of the additional features/aspects of example embodiments of the invention described above in relation to example computer-implemented methods of the invention.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1:
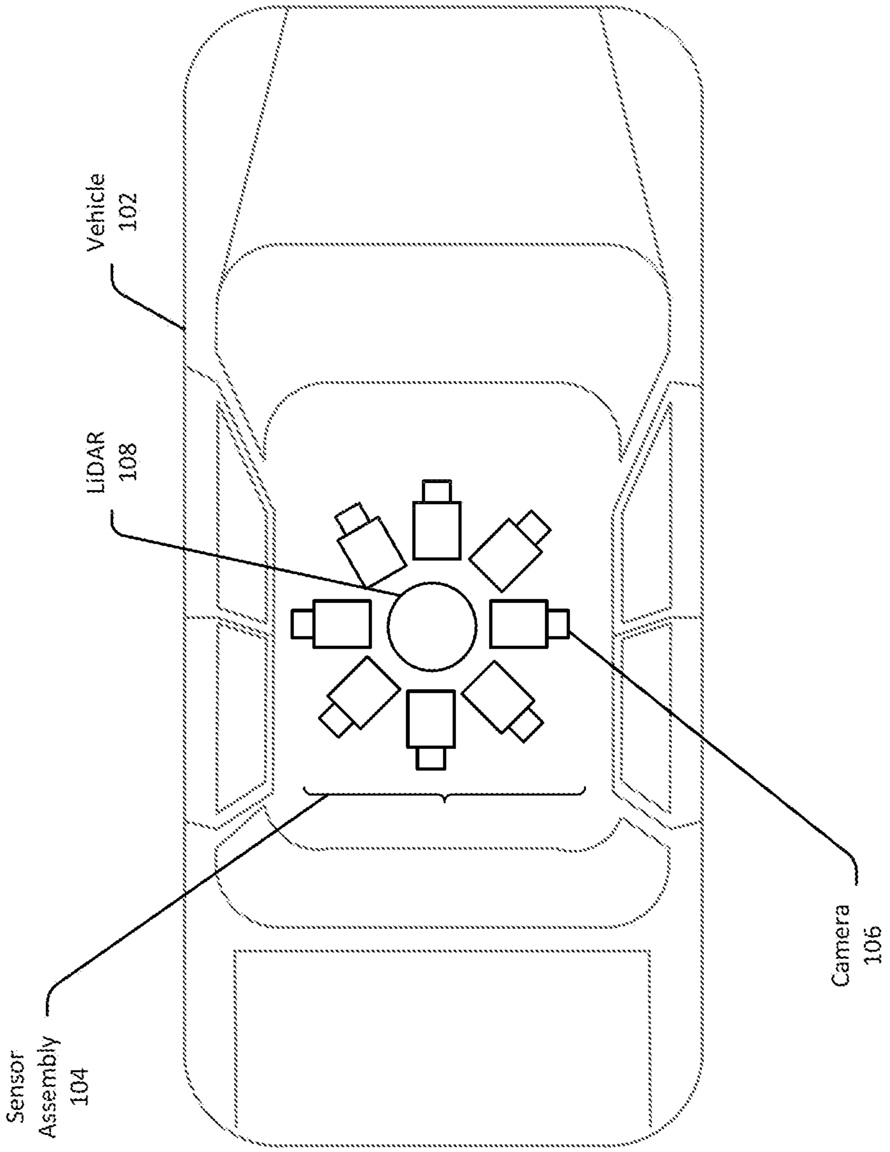
FIG. 1 is an aerial view of a sensor assembly in accordance with an example embodiment of the invention.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

In general, a vehicle (e.g., an autonomous vehicle, a driverless vehicle, etc.) can have a myriad of sensors onboard the vehicle. Such sensors can be disposed on an exterior or in an interior of a vehicle and can include, without limitation, LiDAR sensors, radars, cameras, GPS receivers, sonar-based sensors, ultrasonic sensors, IMUs, accelerometers, gyroscopes, magnetometers, FIR sensors, and so forth. Such sensors play a central role in the functioning and operation of an autonomous or driverless vehicle. For example, LiDARs can be utilized to detect objects (e.g., other vehicles, road signs, pedestrians, buildings, etc.) in an environment around a vehicle. LiDARs can also be utilized to determine relative distances between objects in the environment and between objects and the vehicle. As another non-limiting example, radars can be utilized in connection with collision avoidance, adaptive cruise control, blind spot detection, assisted parking, and other vehicle applications. As yet another non-limiting example, cameras can be utilized to recognize, interpret, and/or identify objects captured in images or visual cues of the objects. Cameras and other optical sensors can capture image data using charge coupled devices (CCDs), complementary metal oxide semiconductors (CMOS), or similar elements. Data collected from these sensors can be processed and used, as inputs, to algorithms configured to make various autonomous driving decisions including decisions relating to when and how much to accelerate, decelerate, change direction, or the like.

In various example embodiments of the invention, the myriad of sensors previously described (e.g., LiDARs, radars, cameras, etc.) provide continuous streams of sensor data that are provided as input to algorithms that perform complex calculations in order to facilitate a multitude of operations required for safe autonomous vehicle operation such as object detection, object classification, object tracking, collision avoidance, vehicle navigation, vehicle acceleration and deceleration, and the like. In order to ensure the accuracy of the calculations, and thus, safe autonomous vehicle operation, coordination and synchronization between the various sensors providing the sensor data is important. Communication latency can make sensor coordination and sensor data synchronization difficult to achieve. In particular, a controller or other centralized computing unit is typically provided to coordinate the functions of multiple sensors.

This centralized computing unit often does not know a position/angle/direction of a sensor with respect to a coordinate reference frame until the sensor communicates that information to the centralized computing unit. Because any form of network communication inherently involves some latency (with different forms of communication and/or different transmission media exhibiting different degrees of latency), the centralized computing unit generally does not receive the communication identifying a sensor's position/angle/direction until the sensor has already changed its position/angle/direction as it executes its scan path. As a result, in conventional sensor coordination systems, the precise time at which a sensor (e.g., a LiDAR sensor) is aligned with another sensor (e.g., a camera) cannot be determined, and thus, sufficient coordination between the sensors (e.g., the camera taking an image of a portion of an environment at a same time that the LiDAR is scanning that portion of the environment) is not achievable.

Various embodiments of the invention overcome technical problems specifically arising in the realm of computer-based technology, and more specifically, in the realm of autonomous vehicle technology. In particular, example embodiments of the invention provide technical solutions to the above-described technical problem in the form of systems, methods, non-transitory computer-readable media, techniques, and methodologies for triggering a sensor operation of a second sensor based on a predicted time of alignment with a first sensor, where operation of the first sensor is simulated to determine the predicted time of alignment. In this manner, the sensor data captured by the two sensors is ensured to be substantially synchronized with respect to the physical environment being sensed. This sensor data synchronization based on predicted alignment of the sensors solves the technical problem of lack of sensor coordination and sensor data synchronization that would otherwise result from the latency associated with communication between sensors and a centralized controller and/or communication between sensors themselves.

More specifically, in example embodiments, a virtual sensor system may be generated. The virtual sensor system may model/simulate the operation of a sensor such as, for example, a LiDAR sensor. While example embodiments of the invention may be described herein in connection with simulating the operation of a LiDAR sensor, it should be appreciated that the sensor being modeled can be any sensor that provides useful data with respect to autonomous vehicle tasks or the like. In example embodiments, generating the virtual sensor system that simulates operation of a sensor may include training a predictive model based on a set of initial parameters. The set of initial parameters may, for example, include baseline specifications of the sensor being modeled. As another non-limiting example, the set of initial parameters may include operational data for the sensor that can be used as seed training data for training the predictive model. In example embodiments, the predictive model may be a machine learning model such as a convolutional neural network, a support vector machine, or the like. In other example embodiments, the predictive model may be a statistical model.

The predictive model may be configured to predict a location of the sensor being modeled, or more particularly, a time at which the sensor will be at a particular location. A sensor function of another sensor can then be triggered based on the predicted time. This ensures that the sensor being modeled and the sensor that is triggered capture data relating to a same portion of the sensed environment, and thus, that the sensors are coordinated and that sensor data received from these sensors is synchronized. As previously noted, sensor coordination and sensor data synchronization are critical to the accuracy of complex calculations based on such sensor data, which in turn, are necessary to ensure safe autonomous vehicle operation. As used herein, the term location may refer to a spatial coordinate (or set of spatial coordinates) that identify a position of a sensor within a reference coordinate system; one or more angles of the sensor with respect to one or more axes of the reference coordinate system; a direction of the sensor in relation to a reference direction such as a coordinate axis of the reference coordinate system; or the like.

In an example embodiment, the sensor being modeled may be a LiDAR sensor. The LiDAR sensor may be provided, for example, on an exterior of a vehicle. In particular, the LiDAR sensor may be provided as part of a sensor assembly that also includes one or more cameras. The sensor assembly may further include other types of sensors such as GPS receivers, IMUs, or the like. The sensor assembly may be positioned, for example, on a roof of the vehicle. The LiDAR sensor may be configured to periodically scan an environment around a vehicle by transmitting pulses of light at periodic intervals as the LiDAR moves along the scan path. The LiDAR sensor may be further configured to measure differences in return times and wavelengths for the light that is reflected back to the LiDAR and generate digital three-dimensional (3D) representations of targets that were illuminated by the light pulses. More specifically, a LiDAR sensor may generate a 3D point cloud (a set of data points in space) representative of a target object that it has illuminated with light during its scan path.

In example embodiments, the 3D point cloud generated by the LiDAR scan can be matched with image data of the scanned area that is captured by a camera in order to produce a 3D model of the target object, perform object identification, or the like. For instance, each point in the 3D point cloud may be given the color of the pixel from an image taken at the same angle and direction as the laser beam that generated the point. As previously noted, however, in order for LiDAR data to be properly synchronized with image data from a camera (e.g., in order for a point cloud generated by a LiDAR scan to coincide with image data), the camera needs to capture the image at a same time that the LiDAR is aligned with the camera during its scan path. That is, the LiDAR's angle/direction/position should be aligned with the camera's angle/direction/position when the camera captures the image in order for the image data to be properly matched and synced to the LiDAR scan data.

Conventional systems for sensor coordination, however, are unable to ascertain the precise location of a LiDAR sensor during its scan (due to communication latency as noted earlier), and as a result, typically capture image data that is misaligned with the LiDAR scan data. Example embodiments of the invention provide a technical solution to this technical problem by providing a virtual sensor system that simulates, for example, operation of the LiDAR sensor, and which can be used to predict the LiDAR scan location over time, and thus, trigger an image capture function of a camera when the LiDAR is predicted to be aligned with the camera.

More specifically, the virtual sensor system may include a predictive model that is trained or otherwise calibrated to predict a time at which the LiDAR sensor will be at a particular location. An image capture function of a camera can then be triggered based on the predicted time. This ensures that the LiDAR sensor being modeled and the camera being triggered capture data relating to a same portion of the sensed environment, and thus, that the sensors are coordinated and that sensor data received from these sensors is synchronized. Because of the criticality of sensor coordination and sensor data synchronization to the accuracy of complex calculations based on such sensor data, which in turn, are necessary to ensure safe autonomous vehicle operation, example embodiments provide a technological improvement over conventional sensor coordination systems and improve the functioning of a computer with respect to the computations that are performed to facilitate autonomous vehicle functionality.

In addition, in example embodiments, the time that a LiDAR sensor is predicted to be at a particular location in its scan path may deviate from the actual time that the LiDAR sensor is at that particular location. More specifically, there may be an error present between the predicted location of the LiDAR sensor and the actual location of the LiDAR when the camera is triggered to capture an image. In certain example embodiments, this error can be determined and provided as feedback data back to the virtual sensor system in order to re-train, recalibrate, or otherwise refine the predictive capability of the predictive model. This error feedback can be performed iteratively such that the error between the predicted location of the LiDAR sensor and the actual location of the LiDAR can be minimized (e.g., bounded within an acceptable error margin). Thus, this capability of re-training/recalibrating the predictive model or otherwise refining the predictive capability of the model based on feedback data that quantifies an error present in the model constitutes another technological improvement over conventional sensor coordination systems.

FIG. 1 is an aerial view of a sensor assembly 104 in accordance with an example embodiment of the invention. The sensor assembly 104 may include a variety of different types of sensors including, for example, one or more LiDAR sensors 108 and one or more cameras 106. Although not depicted in FIG. 1, the sensor assembly 104 may further include other types of sensors such as, for example, one or more IMUs, one or more GPS receivers, and so forth. In the example configuration depicted in FIG. 1, the LiDAR sensor 108 is centrally located on a roof of a vehicle 102 and is surrounded by multiple cameras that are positioned circumferentially around the LiDAR sensor 108. In example embodiments, the LiDAR sensor 108 may periodically rotate through a scan path during which the LiDAR 108 may illuminate objects in the scanned environment with pulses of light and measure the differences in flight times and wavelengths for light that is reflected back to detect the presence of target objects, determine distances between the vehicle 102 and the target objects, determine distances between various target objects, and the like. The LiDAR 108 may exhibit a horizontal scan path and/or a vertical scan path.

In example embodiments, as the LiDAR 108 travels through its scan path, it may become aligned with each camera 106 of the sensor assembly at a respective particular point in time. It would be ideal for each camera 106 to capture an image of the surrounding environment at the moment that the LiDAR 108 is aligned with the camera 106 so that the camera 106 and the LiDAR 108 are capturing sensor data relating to the same segment/portion of the sensed environment. This allows the image data to be matched (e.g., fused) with the LiDAR scan data to facilitate object recognition, for example. As previously noted, however, conventional sensor coordination techniques are unable to precisely determine the LiDAR's 108 location at any given point in time due to latency associated with the LiDAR 108 communicating its position, and thus, cannot ensure that an image capture function of a camera 106 is triggered when the LiDAR 108 is aligned with the camera 106 during its scan. Example embodiments of the invention provide a technical solution to this technical problem, as described in more detail hereinafter.

Figure 2A:
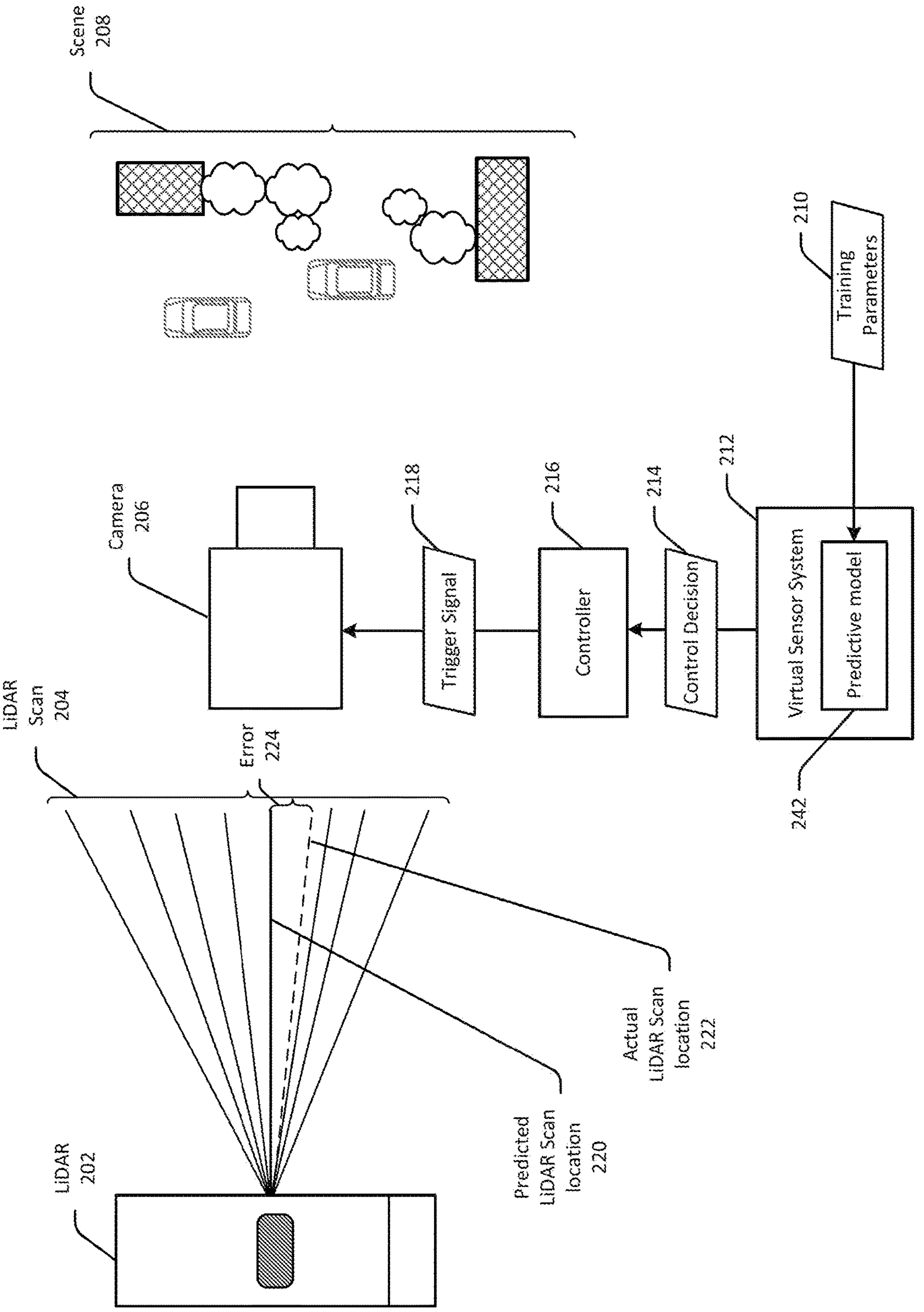
FIG. 2A schematically illustrates triggering of a sensor function of a second sensor based on a simulation of an operation of a first sensor in accordance with an example embodiment of the invention.
Figure 2B:
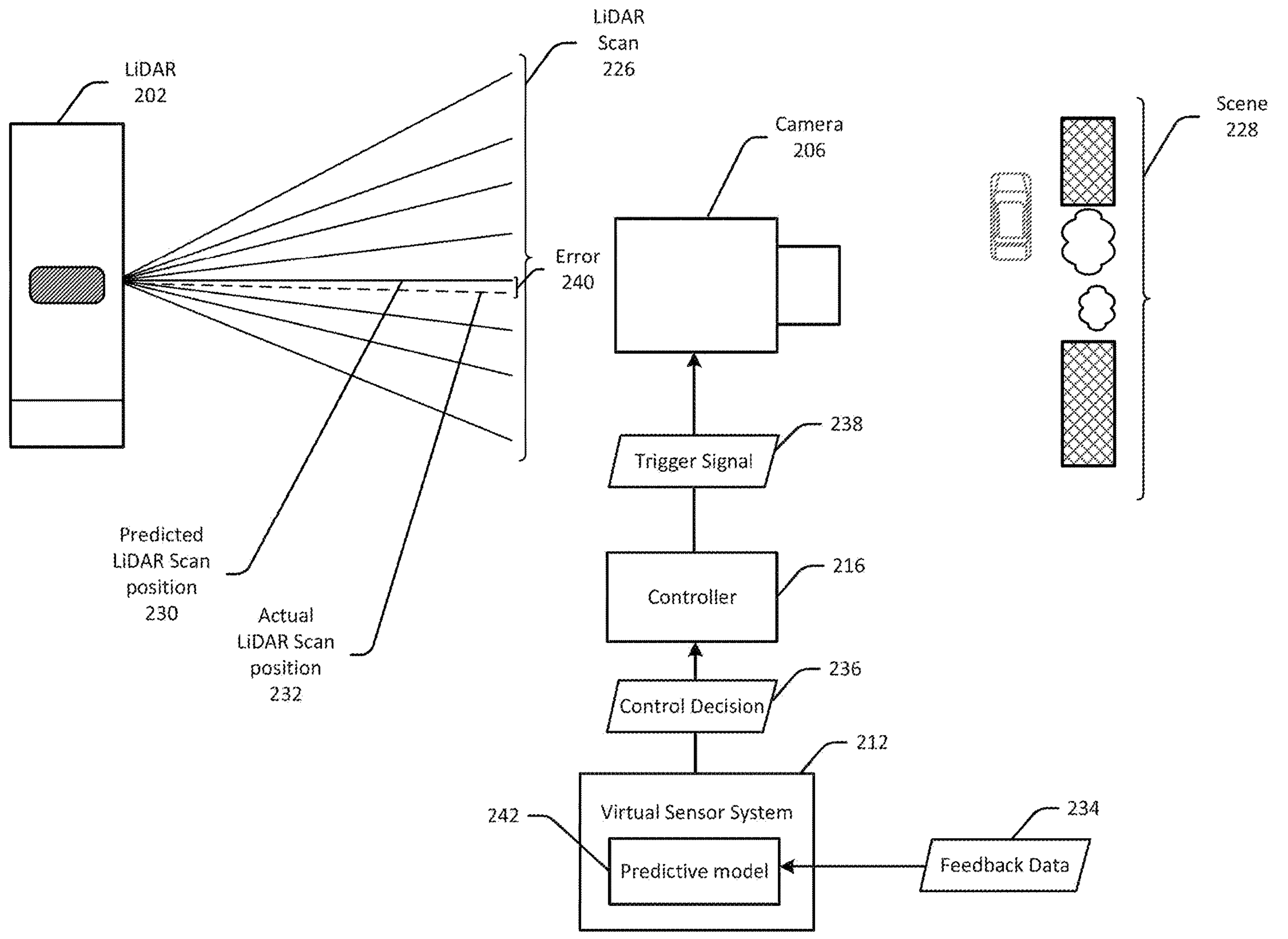
FIG. 2B schematically illustrates triggering of the sensor function of the second sensor based on a re-trained/recalibrated simulation of the operation of the first sensor in accordance with an example embodiment of the invention.
Figure 3:
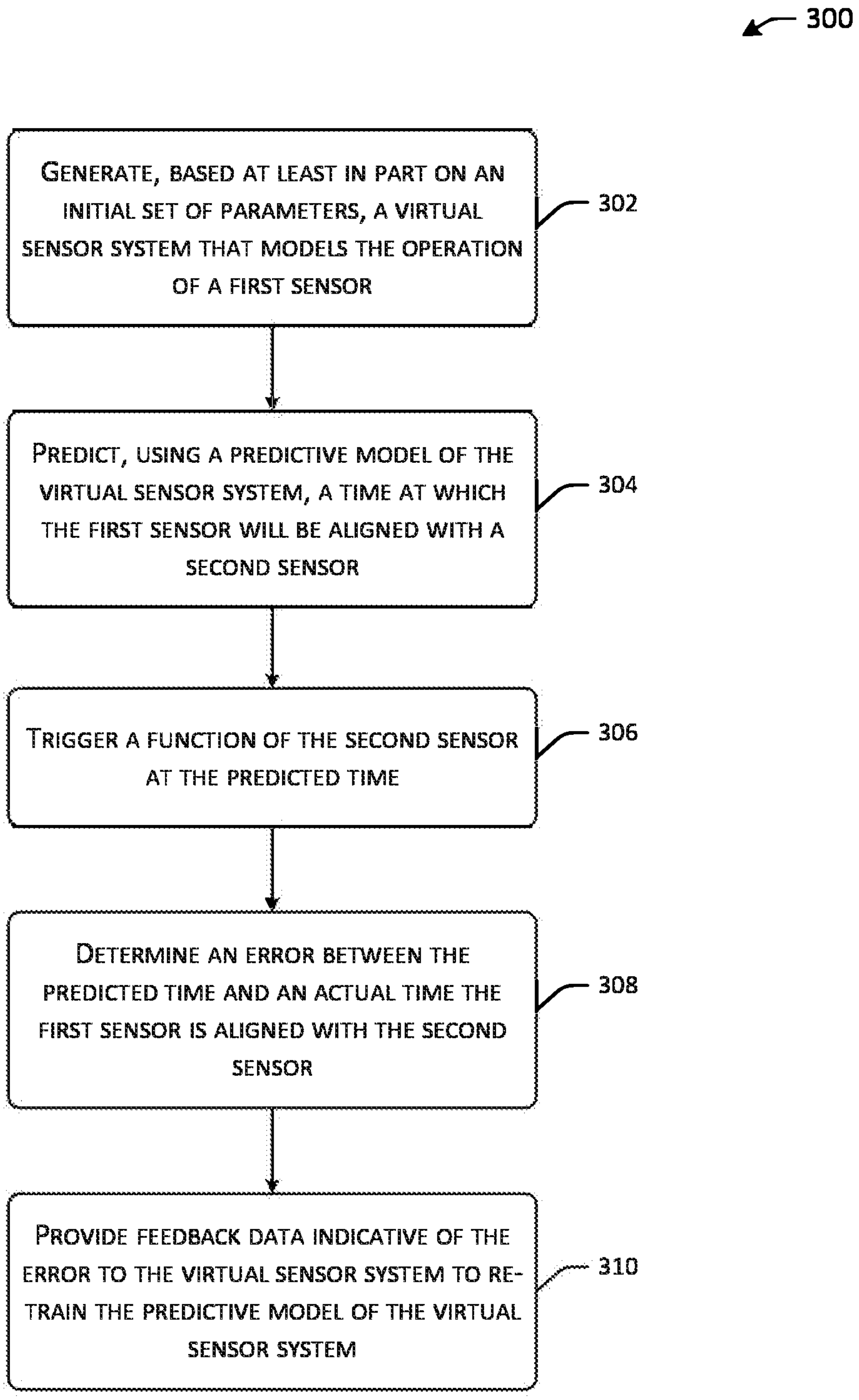
FIG. 3 is a process flow diagram of an illustrative method for generating a virtual sensor system that represents a simulated predictive model of operation of a first sensor and utilizing the simulated predictive model to predict a time of alignment of the first sensor with a second sensor in order to trigger a sensor operation of the second sensor in accordance with an example embodiment of the invention.

FIG. 2A schematically illustrates triggering of a sensor function of a second sensor based on a simulation of an operation of a first sensor in accordance with an example embodiment of the invention. FIG. 2B schematically illustrates triggering of the sensor function of the second sensor based on a re-trained/recalibrated simulation of the operation of the first sensor in accordance with an example embodiment of the invention. FIG. 3 is a process flow diagram of an illustrative method 300 for generating a virtual sensor system that represents a simulated predictive model of operation of a first sensor and utilizing the simulated predictive model to predict a time of alignment of the first sensor with a second sensor in order to trigger a sensor operation of the second sensor in accordance with an example embodiment of the invention. FIG. 3 will be described in conjunction with FIGS. 2A and 2B hereinafter.

Each operation of the method 300 can be performed by one or more of the engines/program modules depicted in FIG. 2A, 2B, or 4, whose operation will be described in more detail hereinafter. These engines/program modules can be implemented in any combination of hardware, software, and/or firmware. In certain example embodiments, one or more of these engines/program modules can be implemented, at least in part, as software and/or firmware modules that include computer-executable instructions that when executed by a processing circuit cause one or more operations to be performed. In example embodiments, these engines/program modules may be customized computer-executable logic implemented within a customized computing machine such as a customized FPGA or ASIC. A system or device described herein as being configured to implement example embodiments of the invention can include one or more processing circuits, each of which can include one or more processing units or cores. Computer-executable instructions can include computer-executable program code that when executed by a processing core can cause input data contained in or referenced by the computer-executable program code to be accessed and processed by the processing core to yield output data.

Referring first to FIG. 3 in conjunction with FIG. 2A, at block 302 of the method 300, a virtual sensor system 212 may be generated based on a set of initial parameters 210. In example embodiments, the virtual sensor system 212 may simulate/model the operation of a first sensor such as a LiDAR sensor 202. More specifically, the virtual sensor system 212 may include a predictive model 242 that is initially trained or calibrated by a training/calibration engine (not shown in FIGS. 2A and 2B) based on the set of initial parameters 210. The predictive model 242 may be configured to predict a time at which the LiDAR 202 is located at a particular position/angle/direction with respect to a reference frame.

In particular, the LiDAR 202 may be configured to periodically perform a scan 204 of a surrounding environment. The predictive model 242 may be configured to predict a time that the LiDAR 202 is at a given position/angle/direction, or equivalently, a position/angle/direction of the LiDAR 202 at a particular point in time. The set of initial parameters 210 used by the training/calibration engine to train or otherwise calibrate the predictive model 242 may be a set of baseline specifications associated with the LiDAR 202 and/or operational data for the LiDAR 202 that is used as ground-truth training data.

At block 304 of the method 300, in example embodiments, the predictive model 242 is used to predict a time at which the first sensor will be aligned with a second sensor such as a camera 206. More specifically, in example embodiments, the predictive model 242 is used to predict a time at which the LiDAR 202 will be aligned with the camera 206 during the scan 204 performed by the LiDAR 202.

At block 306 of the method 300, a sensor function of the second sensor may be triggered at the predicted time. More specifically, in example embodiments, the virtual sensor system 212 may issue a control decision 214 to a controller 216. The control decision 214 may indicate the time at which the LiDAR 202 is predicted to be aligned with the camera 206. Based on the control decision 214, the controller 216 may then issue a trigger signal 218 to trigger the camera 206 to capture an image of a scene 208 at the time indicated by the control decision 214. In this manner, by triggering the camera 206 to capture an image at a time at which the LiDAR 202 is predicted to be aligned with the camera 206, the sensor data captured by the camera 206 is synchronized with the sensor data captured by the LiDAR 206. That is, the camera 206 is triggered to capture an image of a same scene 208 (or portion thereof) that is being scanned by the LiDAR 202 at the predicted time.

In some example embodiments, the camera 206 may include a rolling shutter or the like. In such example embodiments, the camera 206 may not capture an image of the entire scene 208 at once. Rather, the camera 206 may scan the scene 208 rapidly, either horizontally or vertically, and capture images of different portions of the scene 208 at slightly different points in time. Thus, although an entire image of the scene 208 may be presented as if captured at a single instant in time, if the camera 206 utilizes a rolling shutter, then the scene 208 is actually captured by a series of images taken in rapid succession as the camera 206 scans the scene 208.

In such example embodiments, the camera 206 may actually be triggered to perform the image capture function at some point in time prior to or after the LiDAR 202 is predicted to be aligned with the camera 206. In particular, the virtual sensor system 212, and more specifically, the predictive model 242 included therein may account for the delay in image capture that may occur as a result of the rolling shutter. Thus, when predicting the time at which the LiDAR 202 will be aligned with the camera 206, the predictive model 242 may account for the delay in image capture associated with the rolling shutter and take this into account when deciding when to trigger the camera 206.

As a non-limiting example, the trigger signal 218 may trigger the camera 206 to begin an image capture function slightly before the LiDAR 202 is predicted to be aligned with the camera 206. In this manner, the camera 206 may begin capturing images of the scene 208 in rapid succession as it scans the scene 208 such that the camera 206 will capture an image of a same portion of scene 208 that is being scanned by the LiDAR 202 when the LiDAR 202 is aligned with the camera 206. As another non-limiting example, depending on the scanning rate of the LiDAR 202, the camera 206 may actually be triggered to begin the image capture function slightly after the LiDAR 202 is predicted to be aligned with the camera 206. For example, if the scanning speed of the rolling shutter of the camera 206 is significantly slower than the scanning speed of the LiDAR 202, then the camera 206 may be triggered after the LiDAR 202 is predicted to be aligned with the camera 206 such that the camera 206 will be capturing an image of a same portion of a scene when LiDAR repeats the scan 204 and becomes aligned with the camera 206 again.

At block 308 of the method 300, an error 224 between the time that the LiDAR 202 is predicted to be aligned with the camera 206 and the actual time of alignment may be determined. More specifically, the error 224 may represent a deviation between a predicted LiDAR scan location 220 (i.e., the location at which the LiDAR 202 is aligned with the camera 206) and an actual LiDAR scan location 222 (i.e., the actual location of the LiDAR 202 at the time at which the LiDAR is predicted to be aligned with the camera 206). In some example embodiments, the error 224 may be present because the predictive model 242 is not an exact simulation of the actual operation of the LiDAR 202.

Referring now to FIG. 3 in conjunction with FIG. 2B, in example embodiments, at block 310 of the method 300, the error 224 representing a deviation between the location at which the LiDAR 202 is aligned with the camera 206 and the actual location of the LiDAR 202 at the time at which the LiDAR is predicted to be aligned with the camera 206 may be provided as feedback data 234 to the virtual sensor system 212. The predictive model 242 of the virtual sensor system 212 may then be re-trained or recalibrated by the training/calibration engine based on the feedback data 210. In example embodiments, re-training or recalibrating the predictive model 242 of the virtual sensor system 212 may result in a reduction in the error between the predicted LiDAR 202 location and an actual LiDAR location for a subsequent scan 226 performed by the LiDAR.

More specifically, in example embodiments, after the predictive model 242 is re-trained/recalibrated based on the feedback data 234, the predictive model 242 may again predict a time at which the LiDAR 202 will be aligned with the camera 206 during the scan 226. The virtual sensor system 212 may then issue a control decision 236 to the controller 216. The control decision 236 may include an indication of the predicted time. The controller 216 may then issue a trigger signal 238 to trigger an image capture function of the camera 206 at the predicted time (i.e., at the time at which the LiDAR 202 is predicted to be aligned with the camera 206). The camera 206 may be triggered to capture an image (or a series of images in rapid succession if the camera 206 has a rolling shutter) of a same scene 228 or portion thereof being scanned by the LiDAR 202.

In example embodiments, in light of the re-training/recalibration of the predictive model 242 based on the feedback data 234, an error 240 between a predicted LiDAR scan position 230 (i.e., a position at which the LiDAR 202 is aligned with the camera 206) and an actual location 232 of the LiDAR 202 at the time at which the LiDAR 202 is predicted to be aligned with the camera 206 may be reduced as compared to the error 224 during the prior LiDAR scan 204. In example embodiments, the predictive model 212 may be iteratively re-trained/recalibrated based on historical data indicative of the error between a predicted LiDAR location and an actual LiDAR location to reduce the error for subsequent LiDAR scans, improve the predictive capability of the predictive model 242, and even further improve the synchronization between the sensor data captured by the LiDAR 202 and the image data captured by the camera 206.

Hardware Implementation

Figure 4:
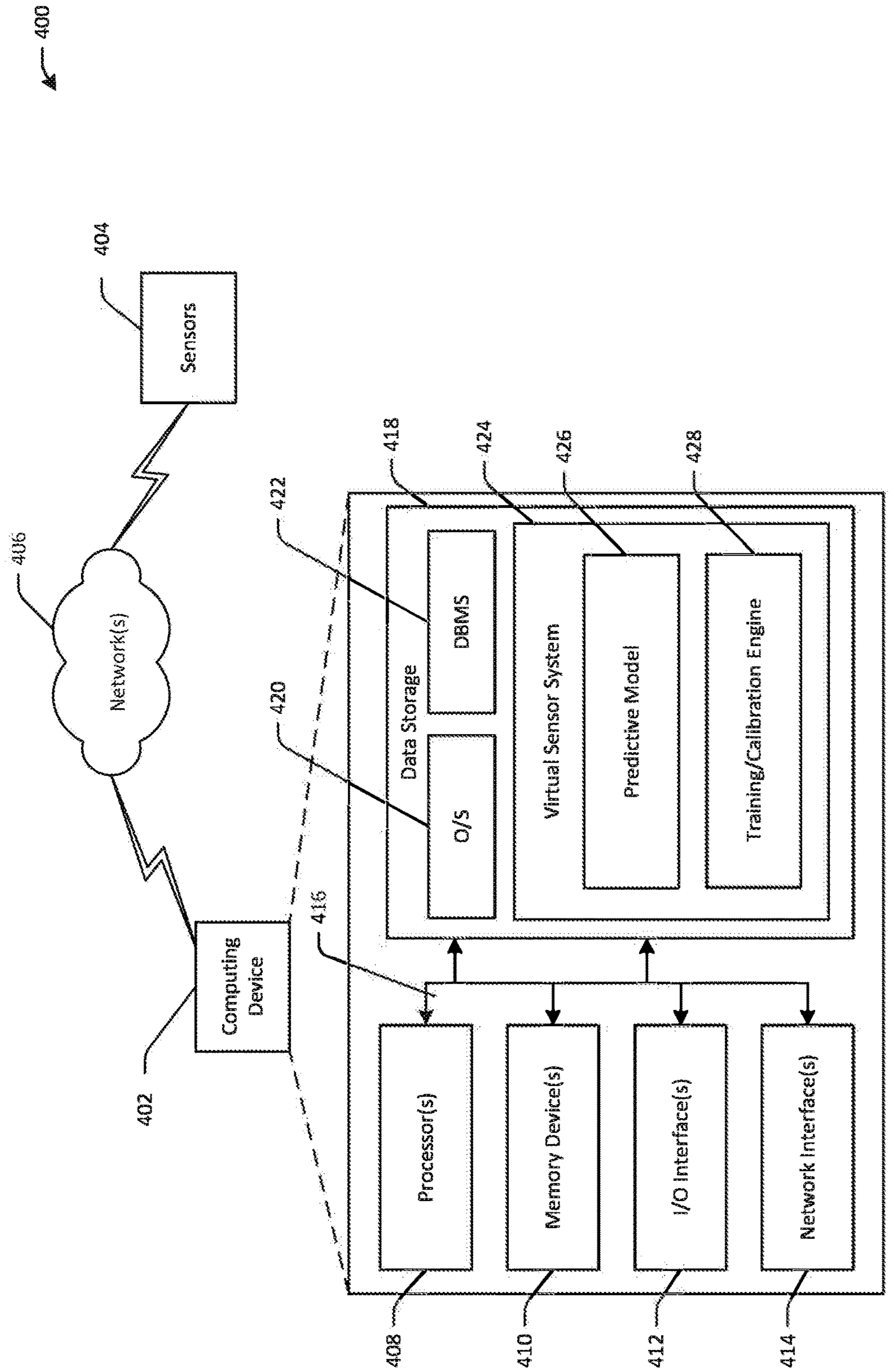
FIG. 4 is a schematic block diagram illustrating an example networked architecture configured to implement example embodiments of the invention.

FIG. 4 is a schematic block diagram illustrating an example networked architecture 400 configured to implement example embodiments of the invention. The networked architecture 400 can include one or more special-purpose computing devices 402 communicatively coupled via one or more networks 406 to various sensors 404. The sensors 404 may include any of the example types of on-board vehicle sensors previously described including, without limitation, LiDAR sensors, radars, cameras, GPS receivers, sonar-based sensors, ultrasonic sensors, IMUs, accelerometers, gyroscopes, magnetometers, FIR sensors, and so forth. In example embodiments, the sensors 404 may include on-board sensors provided on an exterior or in an interior of a vehicle such as an autonomous vehicle. The special-purpose computing device(s) 402 may include devices that are integrated with a vehicle and may receive sensor data from the sensors 404 via a local network connection (e.g., WiFi, Bluetooth, Dedicated Short Range Communication (DSRC), or the like). In other example embodiments, the special-purpose computing device(s) 402 may be provided remotely from a vehicle and may receive the sensor data from the sensors 404 via one or more long-range networks.

The special-purpose computing device(s) 402 may be hard-wired to perform the techniques; may include circuitry or digital electronic devices such as one or more ASICs or FPGAs that are persistently programmed to perform the techniques; and/or may include one or more hardware processors programmed to perform the techniques pursuant to program instructions in firmware, memory, other storage, or a combination thereof. The special-purpose computing device(s) 402 may also combine custom hard-wired logic, ASICs, or FPGAs with custom programming to accomplish the techniques. The special-purpose computing device(s) 402 may be desktop computer systems, server computer systems, portable computer systems, handheld devices, networking devices or any other device or combination of devices that incorporate hard-wired and/or programmed logic to implement the techniques.

The special-purpose computing device(s) may be generally controlled and coordinated by operating system software 420, such as IOS, Android, Chrome OS, Windows XP, Windows Vista, Windows 4, Windows 8, Windows Server, Windows CE, Unix, Linux, SunOS, Solaris, iOS, Blackberry OS, VxWorks, or other compatible operating systems. In other embodiments, the computing device(s) 402 may be controlled by a proprietary operating system. The operating system software 420 may control and schedule computer processes for execution; perform memory management; provide file system, networking, and I/O services; and provide user interface functionality, such as a graphical user interface ("GUI").

While the computing device(s) 402 and/or the sensors 404 may be described herein in the singular, it should be appreciated that multiple instances of any such component can be provided and functionality described in connection any particular component can be distributed across multiple instances of such a component. In certain example embodiments, functionality described herein in connection with any given component of the architecture 400 can be distributed among multiple components of the architecture 400. For example, at least a portion of functionality described as being provided by a computing device 402 may be distributed among multiple such computing devices 402.

The network(s) 406 can include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 406 can have any suitable communication range associated therewith and can include, for example, global networks (e.g., the Internet), metropolitan area networks (MANs), wide area networks (WANs), local area networks (LANs), or personal area networks (PANs). In addition, the network(s) 406 can include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 402 can include one or more processors (processor(s)) 408, one or more memory devices 410 (generically referred to herein as memory 410), one or more input/output ("I/O") interface(s) 412, one or more network interfaces 414, and data storage 418. The computing device 402 can further include one or more buses 416 that functionally couple various components of the computing device 402. The data storage may store one or more engines, program modules, components, or the like including, without limitation, a virtual sensor system 424 that represents a virtual simulation of the operation of one or more of the sensors 404. The virtual sensor system 424 may, in turn, include one or more engines, program modules, components, or the like including, without limitation, a predictive model 426 and a training/calibration engine 428. Each of the engines/components depicted in FIG. 4 may include logic for performing any of the processes or tasks described earlier in connection with correspondingly named engines/components. In certain example embodiments, any of the depicted engines/components may be implemented in hard-wired circuitry within digital electronic devices such as one or more ASICs or FPGAs that are persistently programmed to perform corresponding techniques.

The bus(es) 416 can include at least one of a system bus, a memory bus, an address bus, or a message bus, and can permit the exchange of information (e.g., data (including computer-executable code), signaling, etc.) between various components of the computing device 402. The bus(es) 416 can include, without limitation, a memory bus or a memory controller, a peripheral bus, an accelerated graphics port, and so forth. The bus(es) 416 can be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 410 can include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, can include non-volatile memory. In certain example embodiments, volatile memory can enable faster read/write access than non-volatile memory. However, in certain other example embodiments, certain types of non-volatile memory (e.g., FRAM) can enable faster read/write access than certain types of volatile memory.

In various implementations, the memory 410 can include multiple different types of memory such as various types of static random access memory (SRAM), various types of dynamic random access memory (DRAM), various types of unalterable ROM, and/or writeable variants of ROM such as electrically erasable programmable read-only memory (EE- PROM), flash memory, and so forth. The memory 410 can include main memory as well as various forms of cache memory such as instruction cache(s), data cache(s), translation lookaside buffer(s) (TLBs), and so forth. Further, cache memory such as a data cache can be a multi-level cache organized as a hierarchy of one or more cache levels (L1, L2, etc.). In example embodiments, the memory 410 may include the data storage 106(1)-106(P) and/or the data storage 120 depicted in FIG. 1. Alternatively, the data storage 106(1)-106(P) may be hard disk storage forming part of the data storage 418 and/or the data storage 120 may be a form of RAM or cache memory that is provided as part of the FOV semantics computing machine 424 itself.

The data storage 418 can include removable storage and/or non-removable storage including, but not limited to, magnetic storage, optical disk storage, and/or tape storage. The data storage 418 can provide non-volatile storage of computer-executable instructions and other data. The memory 410 and the data storage 418, removable and/or non-removable, are examples of computer-readable storage media (CRSM) as that term is used herein. The data storage 418 can store computer-executable code, instructions, or the like that can be loadable into the memory 410 and executable by the processor(s) 408 to cause the processor(s) 408 to perform or initiate various operations. The data storage 418 can additionally store data that can be copied to memory 410 for use by the processor(s) 408 during the execution of the computer-executable instructions. Moreover, output data generated as a result of execution of the computer-executable instructions by the processor(s) 408 can be stored initially in memory 410 and can ultimately be copied to data storage 418 for non-volatile storage.

More specifically, the data storage 418 can store one or more operating systems (O/S) 420 and one or more database management systems (DBMS) 422 configured to access the memory 410 and/or one or more external datastore(s) (not depicted) potentially via one or more of the networks 406. In addition, the data storage 418 may further store one or more program modules, applications, engines, computer-executable code, scripts, or the like. For instance, any of the engines/components depicted in FIG. 4 may be implemented as software and/or firmware that includes computer-executable instructions (e.g., computer-executable program code) loadable into the memory 410 for execution by one or more of the processor(s) 408 to perform any of the techniques described herein.

Although not depicted in FIG. 4, the data storage 418 can further store various types of data utilized by engines/components of the computing device 402. Such data may include, without limitation, sensor data, feedback data including historical sensor operational data, initial parameter data, or the like. Any data stored in the data storage 418 can be loaded into the memory 410 for use by the processor(s) 408 in executing computer-executable program code. In addition, any data stored in the data storage 418 can potentially be stored in one or more external datastores that are accessible via the DBMS 422 and loadable into the memory 410 for use by the processor(s) 408 in executing computer-executable instructions/program code.

The processor(s) 408 can be configured to access the memory 410 and execute computer-executable instructions/program code loaded therein. For example, the processor(s) 408 can be configured to execute computer-executable instructions/program code of the various engines/components of the FOV semantics computing machine 424 to cause or facilitate various operations to be performed in accordance with one or more embodiments of the invention. The processor(s) 408 can include any suitable processing unit capable of accepting data as input, processing the input data in accordance with stored computer-executable instructions, and generating output data. The processor(s) 408 can include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 408 can have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 408 can be made capable of supporting any of a variety of instruction sets.

Referring now to other illustrative components depicted as being stored in the data storage 418, the O/S 420 can be loaded from the data storage 418 into the memory 410 and can provide an interface between other application software executing on the computing device 402 and hardware resources of the computing device 402. More specifically, the O/S 420 can include a set of computer-executable instructions for managing hardware resources of the computing device 402 and for providing common services to other application programs. In certain example embodiments, the O/S 420 can include or otherwise control execution of one or more of the engines/program modules stored in the data storage 418. The O/S 420 can include any operating system now known or which can be developed in the future including, but not limited to, any server operating system, any mainframe operating system, or any other proprietary or non-proprietary operating system.

The DBMS 422 can be loaded into the memory 410 and can support functionality for accessing, retrieving, storing, and/or manipulating data stored in the memory 410, data stored in the data storage 418, and/or data stored in external datastore(s). The DBMS 422 can use any of a variety of database models (e.g., relational model, object model, etc.) and can support any of a variety of query languages. The DBMS 422 can access data represented in one or more data schemas and stored in any suitable data repository. Datastore(s) that may be accessible by the computing device 402 via the DBMS 422, can include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the computing device 402, the input/output (I/O) interface(s) 412 can facilitate the receipt of input information by the computing device 402 from one or more I/O devices as well as the output of information from the computing device 402 to the one or more I/O devices. The I/O devices can include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components can be integrated into the computing device 402 or can be separate therefrom. The I/O devices can further include, for example, any number of peripheral devices such as data storage devices, printing devices, and so forth.

The I/O interface(s) 412 can also include an interface for an external peripheral device connection such as universal serial bus (USB), FireWire, Thunderbolt, Ethernet port or other connection protocol that can connect to one or more networks. The I/O interface(s) 412 can also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The computing device 402 can further include one or more network interfaces 414 via which the computing device 402 can communicate with any of a variety of other systems, platforms, networks, devices, and so forth. The network interface(s) 414 can enable communication, for example, with the sensors 404 and/or one or more other devices via one or more of the network(s) 406. In example embodiments, the network interface(s) 414 provide a two-way data communication coupling to one or more network links that are connected to one or more of the network(s) 406. For example, the network interface(s) 414 may include an integrated services digital network (ISDN) card, a cable modem, a satellite modem, or a modem to provide a data communication connection to a corresponding type of telephone line. As another non-limiting example, the network interface(s) 414 may include a local area network (LAN) card to provide a data communication connection to a compatible LAN (or a wide area network (WAN) component to communicate with a WAN). Wireless links may also be implemented. In any such implementation, the network interface(s) 414 may send and receive electrical, electromagnetic, or optical signals that carry digital data streams representing various types of information.

A network link typically provides data communication through one or more networks to other data devices. For example, a network link may provide a connection through a local network to a host computer or to data equipment operated by an Internet Service Provider (ISP). The ISP, in turn, may provide data communication services through the world wide packet data communication network now commonly referred to as the "Internet". Local networks and the Internet both use electrical, electromagnetic, or optical signals that carry digital data streams. The signals through the various network(s) 404 and the signals on network links and through the network interface(s) 414, which carry the digital data to and from the computing device 402, are example forms of transmission media. In example embodiments, the computing device 402 can send messages and receive data, including program code, through the network(s) 406, network links, and network interface(s) 414. For instance, in the Internet example, a server might transmit a requested code for an application program through the Internet, the ISP, a local network, and a network interface 414. The received code may be executed by a processor 408 as it is received, and/or stored in the data storage 418, or other non-volatile storage for later execution.

It should be appreciated that the engines depicted in FIG. 4 as part of the computing device 402 are merely illustrative and not exhaustive. In particular, functionality can be modularized in any suitable manner such that processing described as being supported by any particular engine can alternatively be distributed across multiple engines, program modules, components, or the like, or performed by a different engine, program module, component, or the like. Further, one or more depicted engines may or may not be present in certain embodiments, while in other embodiments, additional engines not depicted can be present and can support at least a portion of the described functionality and/or additional functionality. In addition, various engine(s), program module(s), script(s), plug-in(s), Application Programming Interface(s) (API(s)), or any other suitable computer-executable code hosted locally on the computing device 402 and/or hosted on other computing device(s) (e.g., 402) accessible via one or more of the network(s) 402, can be provided to support functionality provided by the engines depicted in FIG. 4 and/or additional or alternate functionality. In addition, engines that support functionality described herein can be implemented, at least partially, in hardware and/or firmware and can be executable across any number of computing devices 402 in accordance with any suitable computing model such as, for example, a client-server model, a peer-to-peer model, and so forth.

It should further be appreciated that the computing device 402 can include alternate and/or additional hardware, software, and/or firmware components beyond those described or depicted without departing from the scope of the invention. More particularly, it should be appreciated that software, firmware, and/or hardware components depicted as forming part of the computing device 402 are merely illustrative and that some components may or may not be present or additional components may be provided in various embodiments. It should further be appreciated that each of the engines depicted and described represent, in various embodiments, a logical partitioning of supported functionality. This logical partitioning is depicted for case of explanation of the functionality and may or may not be representative of the structure of software, hardware, and/or firmware for implementing the functionality.

In general, the terms engine, program module, or the like, as used herein, refer to logic embodied in hardware, firmware, and/or circuitry, or to a collection of software instructions, possibly having entry and exit points, written in a programming language, such as, for example, Java, C or C++. A software engine/module may be compiled and linked into an executable program, installed in a dynamic link library, or may be written in an interpreted programming language such as, for example, BASIC, Perl, or Python. It will be appreciated that software engines/modules may be callable from other engines/modules or from themselves, and/or may be invoked in response to detected events or interrupts. Software engines/modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. "Open source" software refers to source code that can be distributed as source code and/or in compiled form, with a well-publicized and indexed means of obtaining the source, and optionally with a license that allows modifications and derived works. Software instructions may be embedded in firmware and stored, for example, on flash memory such as erasable programmable read-only memory (EPROM). It will be further appreciated that hardware modules/engines may include connected logic units, such as gates and flip-flops, and/or may be further include programmable units, such as programmable gate arrays or processors.

Example embodiments are described herein as including engines or program modules. Such engines/program modules may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a field programmable gate array (FPGA) or an application specific integrated circuit (ASIC). A hardware engine may also include programmable logic or circuitry that is temporarily configured by software to perform certain operations. For example, a hardware engine may include a general-purpose processor or other programmable processor configured by software, in which case, the configured processor becomes a specific machine uniquely tailored to perform the configured functions and no longer constitute general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the term "engine" or "program module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware engines are temporarily configured (e.g., programmed), each of the hardware engines need not be configured or instantiated at any one instance in time. For example, where a hardware engine includes a general-purpose processor configured by software to become a special-purpose processor, the general-purpose processor may be configured as respectively different special-purpose processors (e.g., comprising different hardware engines) at different times. Software accordingly can configure a particular processor or processors, for example, to constitute a particular hardware engine at a given instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute an implementation of a hardware engine. Similarly, the methods described herein may be at least partially processor-implemented, with a particular processor or processors being an example of hardware. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations of example methods described herein may be distributed among multiple processors, not only residing within a single machine, but deployed across a number of machines. In some example embodiments, the processors may be located in a single geographic location (e.g., within a home environment, an office environment, or a server farm). In other example embodiments, the processors may be distributed across a number of geographic locations.

The present invention may be implemented as a system, a method, and/or a computer program product. The computer program product may include a computer readable storage medium (or media) having computer readable program instructions embodied thereon for causing a processor to carry out aspects of the present invention.

The computer readable storage medium is a form of non-transitory media, as that term is used herein, and can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. The computer readable storage medium, and non-transitory media more generally, may include non-volatile media and/or volatile media. A non-exhaustive list of more specific examples of a computer readable storage medium includes the following: a portable computer diskette such as a floppy disk or a flexible disk; a hard disk; a random access memory (RAM), a read-only memory (ROM), an erasable programmable read-only memory (EPROM or Flash memory), a static random access memory (SRAM), or any other memory chip or cartridge; a portable compact disc read-only memory (CD-ROM); a digital versatile disk (DVD); a memory stick; a solid state drive; magnetic tape or any other magnetic data storage medium; a mechanically encoded device such as punch-cards or raised structures in a groove having instructions recorded thereon or any physical medium with patterns of holes; any networked versions of the same; and any suitable combination of the foregoing.

Non-transitory media is distinct from transmission media, and thus, a computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Non-transitory media, however, can operate in conjunction with transmission media. In particular, transmission media may participate in transferring information between non-transitory media. For example, transmission media can include coaxial cables, copper wire, and/or fiber optics, including the wires that include at least some of the bus(es) 402. Transmission media can also take the form of acoustic or light waves, such as those generated during radio-wave and infra-red data communications.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider (ISP)). In some embodiments, electronic circuitry including, for example, programmable logic circuitry, FPGAs, or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various features and processes described above may be used independently of one another or may be combined in various ways. All possible combinations and sub-combinations are intended to fall within the scope of the invention. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed partially, substantially, or entirely concurrently, or the blocks may sometimes be executed in the reverse order, depending upon the functionality involved.

It should be emphasized that many variations and modifications may be made to the above-described embodiments, the elements of which are to be understood as being among other example embodiments of the invention. All such modifications and variations are intended to be included herein within the scope of the invention. While example embodiments of the invention may be referred to herein, individually or collectively, by the term "invention," this is merely for convenience and does not limit the scope of the invention to any single disclosure or concept if more than one is, in fact, disclosed. The foregoing description details certain embodiments of the invention. It will be appreciated, however, that no matter how detailed the foregoing appears in text, the invention can be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

The embodiments illustrated herein are described in sufficient detail to enable those skilled in the art to practice the teachings disclosed. Other embodiments may be used and derived therefrom, such that structural and logical substitutions and changes may be made without departing from the scope of the invention. The Detailed Description, therefore, is not to be taken in a limiting sense, and the scope of various embodiments is defined only by the appended claims, along with the full range of equivalents to which such claims are entitled.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

As used herein, the term "or" may be construed in either an inclusive or exclusive sense. Moreover, plural instances may be provided for resources, operations, or structures described herein as a single instance. Additionally, boundaries between various resources, operations, program modules, engines, and/or datastores are somewhat arbitrary, and particular operations are illustrated in a context of specific illustrative configurations. Other allocations of functionality are envisioned and may fall within a scope of various embodiments of the invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the invention as represented by the appended claims. The specification and drawings are, accordingly, to be regarded in an illustrative rather than a restrictive sense.

Conditional language, such as, among others, "can," "could." "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. In addition, it should be appreciated that any operation, element, component, data, or the like described herein as being based on another operation, element, component, data, or the like can be additionally based on one or more other operations, elements, components, data, or the like. Accordingly, the phrase "based on," or variants thereof, should be interpreted as "based at least in part on."

What is claimed is:

1. A computer-implemented method for triggering a sensor operation, the method comprising:
- receiving a set of parameters associated with an operation of a first sensor;
- predicting, by a predictive model, based at least in part on the set of parameters, a time at which the first sensor will be aligned with a second sensor;
- triggering the second sensor to perform the sensor operation comprising an image capture function relating to a common location for the first sensor and the second sensor based at least in part on the predicted time;
- determining an error between the predicted time and an actual time that the first sensor was aligned with the second sensor; and
- providing feedback data comprising an indication of the error to the predictive model to update the predictive model.

2. The computer-implemented method of claim 1, wherein the predicting of the time at which the first sensor will be aligned with the second sensor comprises predicting a time at which a first angle, a first direction, and a first position of the first sensor matches, to within respective threshold ranges, of a second angle, a second direction, and a second position of the second sensor.

3. The computer-implemented method of claim 1, wherein the predicting of the time at which the first sensor will be aligned with the second sensor comprises compensating for a communication latency between the first sensor and the second sensor and a delay attributed to a rolling shutter of the second sensor.

4. The computer-implemented method of claim 1, wherein the triggering of the second sensor to perform the sensor operation is based on a difference in scanning speeds between the first sensor and the second sensor.

5. The computer-implemented method of claim 4, wherein the triggering of the second sensor comprises, in response to a scanning speed of the second sensor being less than a scanning speed of the first sensor, triggering the second sensor after the predicted time such that the second sensor will be predicted to be aligned with the first sensor upon the first sensor repeating a scan.

6. The computer-implemented method of claim 1, further comprising:
- following the update to the predictive model, predicting an updated time at which the first sensor will be aligned with the second sensor.

7. The computer-implemented method of claim 6, further comprising:
- triggering the second sensor to perform the sensor operation comprising an image capture function relating to a common location for the first sensor and the second sensor based at least in part on the updated predicted time.

8. A system for triggering a sensor operation, the system comprising:
- at least one processor; and
- at least one memory storing computer-executable instructions, wherein the at least one processor is configured to access the at least one memory and execute the computer-executable instructions to perform:
  - receiving a set of parameters associated with an operation of a first sensor;

predicting, by a predictive model, based at least in part on the set of parameters, a time at which the first sensor will be aligned with a second sensor;

triggering the second sensor to perform the sensor operation comprising an image capture function relating to a common location for the first sensor and the second sensor based at least in part on the predicted time;

determining an error between the predicted time and an actual time that the first sensor was aligned with the second sensor; and providing feedback data comprising an indication of the error to the predictive model to update the predictive model.

9. The system of claim 8, wherein the predicting of the time at which the first sensor will be aligned with the second sensor comprises predicting a time at which a first angle, a first direction, and a first position of the first sensor matches, to within respective threshold ranges, of a second angle, a second direction, and a second position of the second sensor.

10. The system of claim 8, wherein the predicting of the time at which the first sensor will be aligned with the second sensor comprises compensating for a communication latency between the first sensor and the second sensor and a delay attributed to a rolling shutter of the second sensor.

11. The system of claim 8, wherein the triggering of the second sensor to perform the sensor operation is based on a difference in scanning speeds between the first sensor and the second sensor.

12. The system of claim 11, wherein the triggering of the second sensor comprises, in response to a scanning speed of the second sensor being less than a scanning speed of the first sensor, triggering the second sensor after the predicted time such that the second sensor will be predicted to be aligned with the first sensor upon the first sensor repeating a scan.

13. The system of claim 8, wherein the at least one processor is configured to access the at least one memory and execute the computer-executable instructions to perform:

following the update to the predictive model, predicting an updated time at which the first sensor will be aligned with the second sensor.

14. The system of claim 13, wherein the at least one processor is configured to access the at least one memory and execute the computer-executable instructions to perform:

triggering the second sensor to perform the sensor operation comprising an image capture function relating to a common location for the first sensor and the second sensor based at least in part on the updated predicted time.

15. A non-transitory computer readable medium comprising instructions that, when executed, cause one or more processors to perform a method, the method comprising:

receiving a set of parameters associated with an operation of a first sensor;

predicting, by a predictive model, based at least in part on the set of parameters, a time at which the first sensor will be aligned with a second sensor;

triggering the second sensor to perform the sensor operation comprising an image capture function relating to a common location for the first sensor and the second sensor based at least in part on the predicted time;

determining an error between the predicted time and an actual time that the first sensor was aligned with the second sensor; and providing feedback data comprising an indication of the error to the predictive model to update the predictive model.

16. The non-transitory computer readable medium of claim 15, wherein the predicting of the time at which the first sensor will be aligned with the second sensor comprises predicting a time at which a first angle, a first direction, and a first position of the first sensor matches, to within respective threshold ranges, of a second angle, a second direction, and a second position of the second sensor.

17. The non-transitory computer readable medium of claim 15, wherein the predicting of the time at which the first sensor will be aligned with the second sensor comprises compensating for a communication latency between the first sensor and the second sensor and a delay attributed to a rolling shutter of the second sensor.

18. The non-transitory computer readable medium of claim 15, wherein the triggering of the second sensor to perform the sensor operation is based on a difference in scanning speeds between the first sensor and the second sensor.

19. The non-transitory computer readable medium of claim 18, wherein the triggering of the second sensor comprises, in response to a scanning speed of the second sensor being less than a scanning speed of the first sensor, triggering the second sensor after the predicted time such that the second sensor will be predicted to be aligned with the first sensor upon the first sensor repeating a scan.

20. The non-transitory computer readable medium of claim 15, wherein the method further comprises:

following the update to the predictive model, predicting an updated time at which the first sensor will be aligned with the second sensor.

* * * * *